United States Patent
Jeong et al.

(10) Patent No.: US 10,495,465 B2
(45) Date of Patent: Dec. 3, 2019

(54) SYSTEM AND METHOD OF EXTRACTING GROUND ROUTE OF AIRCRAFT, AND COMPUTER-READABLE RECORDING MEDIUM THEREOF

(71) Applicant: KOREA AEROSPACE RESEARCH INSTITUTE, Yuseong-gu, Daejeon (KR)

(72) Inventors: Myeong-Sook Jeong, Daejeon (KR); Yeonju Eun, Daejeon (KR); Hyoun Kyoung Kim, Daejeon (KR); Eun Mi Oh, Daejeon (KR); Daekeun Jeon, Daejeon (KR); Sungkwon Hong, Daejeon (KR); Jihyeon Kwon, Seoul (KR)

(73) Assignee: KOREA AEROSPACE RESEARCH INSTITUTE, Daejeon (KR)

(*) Notice: Subject to any disclaimer, the term of this patent is extended or adjusted under 35 U.S.C. 154(b) by 218 days.

(21) Appl. No.: 15/636,696

(22) Filed: Jun. 29, 2017

(65) Prior Publication Data
US 2018/0005530 A1    Jan. 4, 2018

(30) Foreign Application Priority Data
Jun. 30, 2016    (KR) .................. 10-2016-0082666

(51) Int. Cl.
*G01C 21/00* (2006.01)
*G08G 5/06* (2006.01)
*G01S 13/91* (2006.01)

(52) U.S. Cl.
CPC .......... *G01C 21/005* (2013.01); *G08G 5/065* (2013.01); *B64D 2205/00* (2013.01); *G01S 2013/916* (2013.01); *Y02T 50/823* (2013.01)

(58) Field of Classification Search
CPC ............ G08G 5/065; G01S 2013/916; G01S 2019/9335; G01S 2013/9335; B64D 2205/00; G01C 21/005; Y02T 50/823
See application file for complete search history.

(56) References Cited

U.S. PATENT DOCUMENTS

| 8,527,190 B2 * | 9/2013 | Mere ................ G08G 5/065 340/958 |
| 2011/0125400 A1 * | 5/2011 | Michel .............. G08G 5/0021 701/532 |

(Continued)

FOREIGN PATENT DOCUMENTS

KR    10-2009-0035952 A    4/2009

OTHER PUBLICATIONS

Lee et al. "Duplication-node Removal Algorithm considering the Location of the Node in WSN," The Korean Institute of Communication Sciences, 2011.11, pp. 383-384, with English abstract.

(Continued)

*Primary Examiner* — Dale Moyer
(74) *Attorney, Agent, or Firm* — Buchanan Ingersoll & Rooney PC

(57) ABSTRACT

A system for extracting a ground route of an aircraft includes an airport surface detector acquiring ground movement information of an aircraft detected in an airport, a mapper acquiring node information of the airport from a database and mapping the ground movement information with the node information, a route detector detecting taxi route information of the aircraft by collecting adjacent node information of a mapped coordinate and erasing redundant node information among collected adjacent node information, a node identifier identifying start node information or end node information of a taxi route by using stand node information of the aircraft, and a final route extractor extracting a final taxi route including an extracted shortest (Continued)

route by dividing the taxi route into a plurality of sub-routes and applying a shortest route algorithm to the divided sub-routes.

**19 Claims, 11 Drawing Sheets
(6 of 11 Drawing Sheet(s) Filed in Color)**

(56) References Cited

U.S. PATENT DOCUMENTS

| | | | | |
|---|---|---|---|---|
| 2013/0329944 | A1* | 12/2013 | Gellaboina | G01S 3/7864 |
| | | | | 382/103 |
| 2014/0303815 | A1* | 10/2014 | Lafon | G01C 21/3446 |
| | | | | 701/3 |
| 2016/0171899 | A1 | 6/2016 | Depare et al. | |

OTHER PUBLICATIONS

Sook et al., "Node-Link Model Generation of Incheon International Airport," The Korean Society for Aeronautical & space Sciences 2015 Fall Conference, 2015.11, pp. 2082-2085.

Office Action (Notification of Reason for Refusal) dated Nov. 17, 2017, by the Korean Intellectual Property Office in corresponding Korean Patent Application No. 10-2016-0082666, and an English Translation of the Office Action. (11 pages).

Lee et al. "Duplication-node Removal Algorithm considering the Location of the Node in WSN," The Korean Institute of Communication Sciences, 2011.11, pp. 383-384.

* cited by examiner (A)  (B)

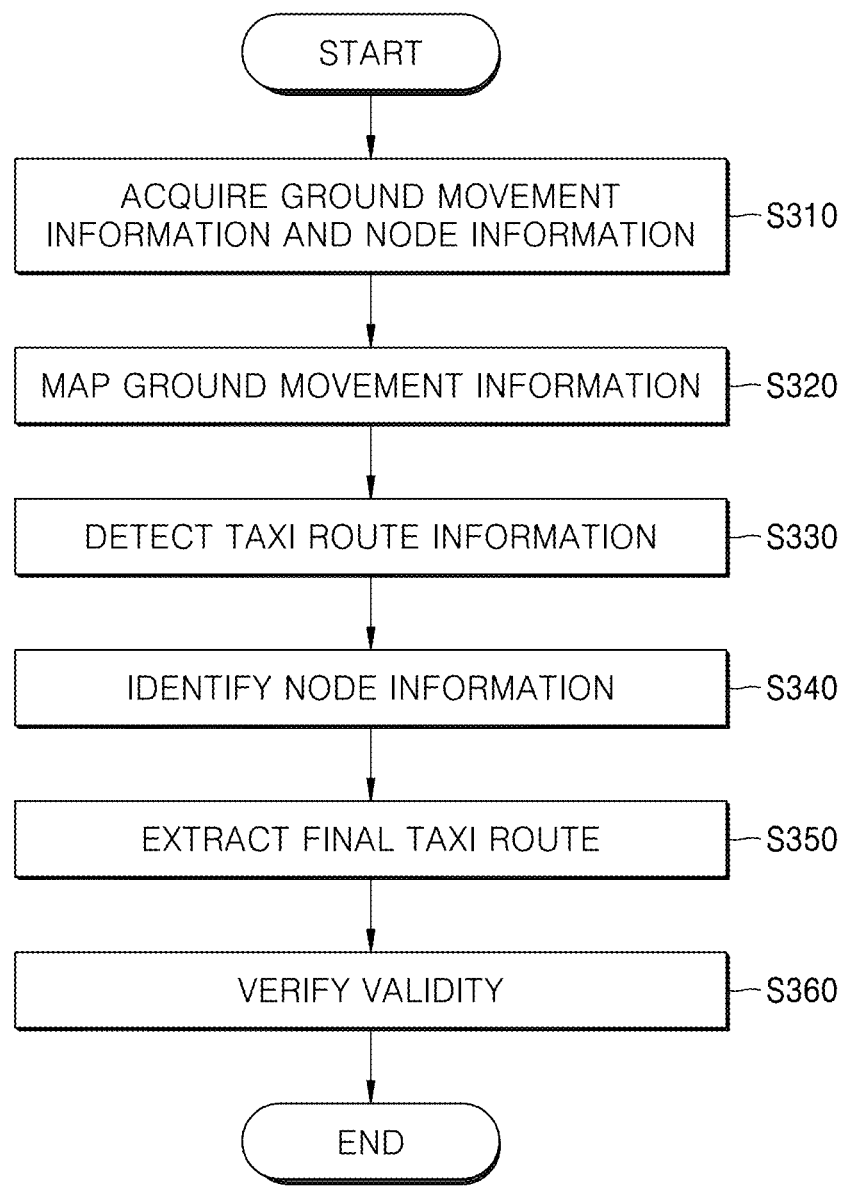

SYSTEM AND METHOD OF EXTRACTING GROUND ROUTE OF AIRCRAFT, AND COMPUTER-READABLE RECORDING MEDIUM THEREOF

CROSS-REFERENCE TO RELATED APPLICATION

This application claims the benefit of Korean Patent Application No. 10-2016-0082666, filed on Jun. 30, 2016, in the Korean Intellectual Property Office, the disclosure of which is incorporated herein in its entirety by reference.

BACKGROUND

1. Field

One or more embodiments relate to a system and a method of extracting a ground route of an aircraft and a computer-readable recording medium thereof, and more particularly, to a system and a method of extracting a ground route of an aircraft, by which ground routes along which actual aircrafts move are extracted by using data obtained by tracking movement routes of the actual aircrafts on the ground in an airport and node information of the airport, and background data for simulation is generated, and a computer-readable recording medium thereof.

2. Description of the Related Art

Fast-time simulators, which are tools for describing operation situations of aircrafts on the ground of an airport and are capable of controlling a simulation speed, have been used to develop algorithms and schedulers for management of arrivals/departures and ground movements of aircrafts.

According to a fast-time simulator, all ground routes along which aircrafts in an airport move are implemented in a network model including nodes and links, various taxi routes of aircrafts are included as a database based on the network model, and ground movements of various aircrafts moving on the ground of an airport may be simulated accordingly.

However, aircraft movement route databases in most fast-time simulators establish aircraft movement routes with a simple combination of various gates and departure and arrival points on a runway based on the aircraft departure and arrival procedures briefly described in the Aeronautical Information Publication (AIP).

However, since the AIP describes only a fundamental aircraft movement route, the route is relatively simple, and thus it is difficult to set various aircraft bypass ground routes that may occur in an actual control situation, in consideration of traffic congestion on an airport surface and a conflict between aircrafts.

SUMMARY

One or more embodiments include a system and a method of extracting a ground route of an aircraft, which may generate a relatively accurate movement route by reflecting an actual situation, in a ground movement simulation of aircrafts in an airport, and a computer-readable recording medium thereof.

Additional aspects will be set forth in part in the description which follows and, in part, will be apparent from the description, or may be learned by practice of the presented embodiments.

According to one or more embodiments, a system for extracting a ground route of an aircraft includes an airport surface detector acquiring ground movement information of an aircraft detected in an airport, a mapper acquiring node information of the airport from a database and mapping the ground movement information with the node information, a route detector detecting taxi route information of the aircraft by collecting adjacent node information of a mapped coordinate and erasing redundant node information among collected adjacent node information, a node identifier identifying start node information or end node information of a taxi route by using stand node information of the aircraft, and a final route extractor extracting a final taxi route including an extracted shortest route by dividing the taxi route into a plurality of sub-routes and applying a shortest route algorithm to the divided sub-routes.

The ground movement information of the aircraft may include location information and speed information of the aircraft, and time information regarding when the location information and speed information of the aircraft may be detected.

The airport surface detector may include the Airport Surface Detection Equipment (ASDE).

The node identifier may determine a stand node when stand node information of an aircraft does not exist, determine a node closest to a first position of the aircraft acquired by the airport surface detector to be the stand node, from among a gate node, a park node, and a deicing node, when the aircraft is a departing aircraft, and determine a node closest to a final position of the aircraft acquired by the airport surface detector to be the stand node, from among the gate node, the park node, and the deicing node, when the aircraft is an arriving aircraft.

The mapper may include a coordinate converting module that converts coordinates of location information included in the ground movement information to coordinates corresponding to the node information, and the coordinate converting module maps converted coordinates of the location information with the node information.

The system may further include a validity verifier verifying validity of the final taxi route, wherein the validity verifier determines the final taxi route to be a valid final taxi route only when the final taxi route includes an essential node.

The essential node may include one of a gate node, a park node, and a deicing node, and further include one departure node when the aircraft is a departing aircraft and one arrival node when the aircraft is an arriving aircraft.

The final route extractor may extract a shortest route by using a Dijkstra algorithm.

The node information may be acquired by an Aeronautical Information Publication (AIP) of the airport.

According to one or more embodiments, a method of extracting a ground route of an aircraft includes acquiring ground movement information of an aircraft detected in an airport and node information of the airport, mapping the ground movement information with the node information, detecting taxi route information of the aircraft by collecting adjacent node information of a mapped coordinate and erasing redundant node information among collected adjacent node information, identifying start node information or end node information included in a taxi route by using stand node information of the aircraft, and extracting a final taxi route including an extracted shortest route by dividing the taxi route into a plurality of sub-routes and applying a shortest route algorithm to the divided sub-routes.

The ground movement information of the aircraft may include location information and speed information of the aircraft, and time information regarding when the location information and speed information of the aircraft may be detected.

The airport surface detector may include Airport Surface Detection Equipment (ASDE).

In the identifying of the start node information or the end node information, a stand node may be determined when stand node information of an aircraft does not exist, wherein, from among a gate node, a park node, and a deicing node, a node closest to a first position of the aircraft acquired by the airport surface detector is determined to be the stand node when the aircraft is a departing aircraft, and, from among the gate node, the park node, and the deicing node, a node closest to a final position of the aircraft acquired by the airport surface detector is determined to be the stand node when the aircraft is an arriving aircraft.

The method may further include converting coordinates of location information included in the ground movement information to coordinates corresponding to the node information, wherein, in the mapping of the ground movement information with the node information, converted coordinates of the location information are mapped with the node information.

The method may further include verifying validity of the final taxi route, wherein, in the verifying of validity of the final taxi route, the final taxi route is determined to be a valid final taxi route only when the final taxi route includes an essential node.

The essential node may include one of a gate node, a park node, and a deicing node, and further include one departure node when the aircraft is a departing aircraft and one arrival node when the aircraft is an arriving aircraft.

In the extracting of the final taxi route, a shortest route may be extracted by using a Dijkstra algorithm.

The node information may be acquired by an Aeronautical Information Publication (AIP) of the airport.

According to one or more embodiments, a non-transitory computer-readable storage medium having stored thereon a program, which when executed by a computer, performs one of the methods defined above.

BRIEF DESCRIPTION OF THE DRAWINGS

The patent or application file contains at least one drawing executed in color. Copies of this patent or patent application publication with color drawing(s) will be provided by the Office upon request and payment of the necessary fee. These and/or other aspects will become apparent and more readily appreciated from the following description of the exemplary embodiments, taken in conjunction with the accompanying drawings in which:

FIG. 14 is a flowchart schematically illustrating operations of a method of extracting a ground route of an aircraft, according to another embodiment.

DETAILED DESCRIPTION

Figure 1:
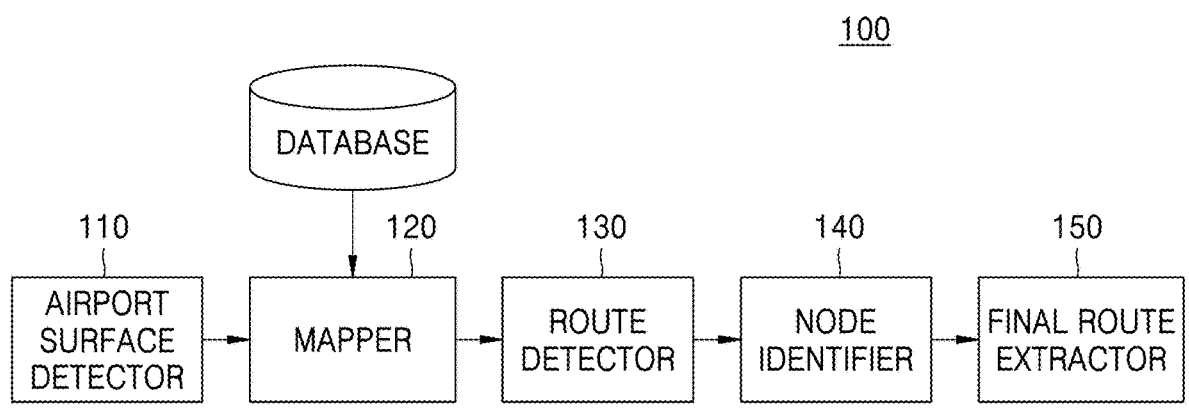
FIG. 1 schematically illustrates a configuration of a system for extracting a ground route of an aircraft, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items.

Terms used in the present specification are used for explaining a specific embodiment, not for limiting the present inventive concept. Thus, an expression used in a singular form in the present specification also includes the expression in its plural form unless clearly specified otherwise in context. Also, terms such as "include" or "comprise" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof. While such terms as "first," "second," etc., may be used to describe various components, such components must not be limited to the above terms. The above terms are used only to distinguish one component from another.

FIG. 1 schematically illustrates a configuration of a system 100 for extracting a ground route of an aircraft, according to an embodiment.

Referring to FIG. 1, the system 100 for extracting a ground route of an aircraft, according to the present embodiment, may include an airport surface detector 110, a mapper 120, a route detector 130, a node identifier 140, and a final route extractor 150.

The airport surface detector 110 acquires ground movement information of an aircraft detected in an airport. The system for extracting a ground route of an aircraft, according to the present embodiment, extracts a ground route of an aircraft, and the airport surface detector 110 acquires information about a movement of an aircraft on the ground in an airport.

Accordingly, when the aircraft is a departing aircraft, ground movement information of the aircraft may be information about a route from a gate before take-off. Furthermore, when the aircraft is an arriving aircraft, ground movement information of the aircraft may be information about a route to a gate after landing.

The ground movement information may include location information and speed information of the aircraft, and time information regarding when the location information and speed information of the aircraft are detected. By analyzing the ground movement information, information about a location of the aircraft on the ground in the airport according to a time, and information about a speed of the aircraft at the location, may be identified.

Furthermore, an actual route until take-off in the airport may be determined and an actual route to a gate after landing may be determined.

To acquire the ground movement information, the airport surface detector 110 may include the Airport Surface Detection Equipment (ASDE). The ASDE may refer to an airport surface detection radar and may be used to monitor a traffic amount on the airport surface and control aircrafts and vehicles running on the ground when the weather in the airport is bad or the position of a control tower is inadequate for clearly observing a runway or taxiway with the naked eye. Furthermore, the radar used for the ASDE may have a high resolution power to identify aircrafts and vehicles on the runway or taxiway and indicate the identified objects on a display device.

The mapper 120 acquires node information of the airport from a database, and maps the ground movement information with the node information.

The node information is obtained by dividing a ramp, a taxiway, a runway, etc. along which aircrafts move in the airport in the form of nodes according to regular rules, and may include modes signifying important positions on the airport surface that may affect a traffic flow, and link information connecting a node to another node.

Furthermore, the node information may be acquired from the Aeronautical Information Publication (AIP) of the airport. Referring to the AIP, an overall ground traffic operation status such as the overall shape of an airport, the number of gates, the Transfer of Control Points (TCP) between a taxiway and a ramp, the direction of transfer of control of each TCP, the direction of a movement of an aircraft on the ramp and taxiway, a push-back procedure of an aircraft for each gate, the shape and number of runway queues, runway operation direction and mode, de-icing facilities, and an operation procedure, may be checked.

The type of nodes may be classified as follows.
GATE NODE: a position of a gate requiring push-back
PARK NODE: a position of a gate where self-starting without push-back is possible
SPOT NODE: a position of TCP
DEPARTURE NODE: a take-off start point on a runway
ARRIVAL NODE: a landing start point on a runway
RAMP NODE: a ground route point of an aircraft on a ramp
TAXI NODE: a ground route point of an aircraft on a taxiway
QUEUE NODE: an aircraft route point in a start queue area
RUNWAY CROSS NODE: a runway crossing point
DEICING NODE: a position of a pad in a de-icing area
DEICINGTAXI NODE: an aircraft route point in a de-icing area Furthermore, the type of links may be classified as follows.
GATE LINK: a link connecting two gate nodes
RAMP LINK: a link connecting two ramp nodes
TAXI LINK: a link connecting two taxi nodes
RUNWAY CROSS LINK: a link connecting two runway cross nodes
QUEUE LINK: a link connecting two queue nodes in a start queue area
DEPARTURE LINK: a link connected to a departure node
ARRIVAL LINK: a link connected to an arrival node
SPOT LINK: a link connecting a spot node and a taxi node
DEICING LINK: a link connecting two nodes in a de-icing area The node information may be classified by a node ID and a node type indicated by a number at an important point in the airport, and a coordinate value may be assigned to each node. The coordinate value may be converted to latitude/longitude/altitude values.

Figure 3:
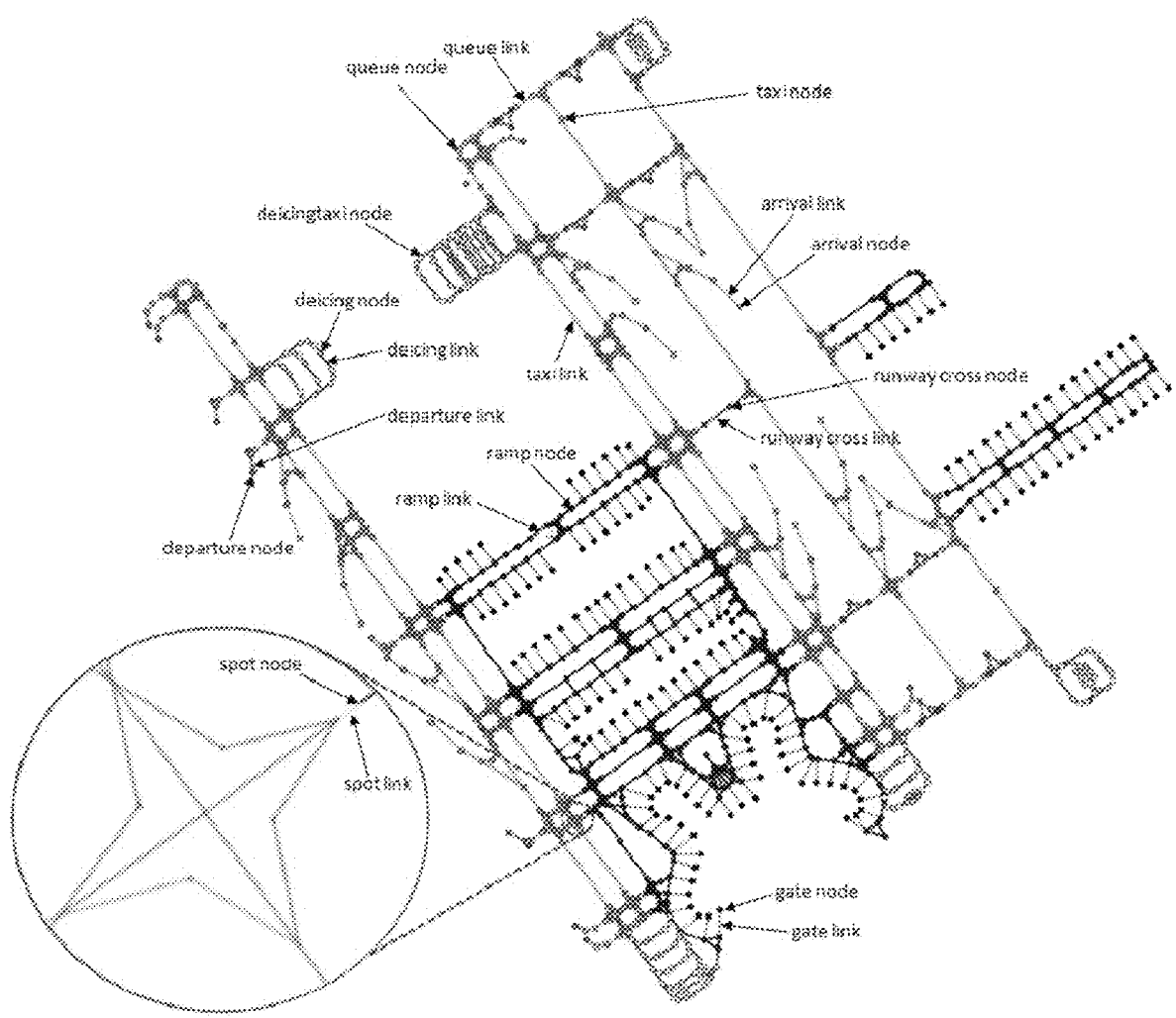
FIGS. 3 to 9 illustrate an example of a process of extracting a taxi route of an aircraft by using the system for extracting a ground route of an aircraft, according to an embodiment.

FIG. 3 illustrates an example of the node information of Incheon International Airport. Referring to FIG. 3, the type of a node and the type of a link included in the node information used by the system for extracting a ground route of an aircraft, according to the present embodiment, may be checked.

In FIG. 3, the same node and the same link are displayed in the same color, and as many as possible of the nodes and links may be included to indicate an actual ground route of an aircraft in the airport.

When a taxi route of an aircraft is generated by referring to the AIP of the airport, the route may be very simple. This is because it is not easy to set various aircraft bypass ground routes that may occur in an actual control situation, in consideration of traffic congestion on an airport surface and a conflict between aircrafts. The mapper 120 maps the ground movement information of the aircraft acquired by the airport surface detector 110 with the node information to extract a ground route of an aircraft actually operated in the airport.

The coordinate value assigned to each node is provided as X (East axis) and Y (North axis) values in an ENU (East, North, Up) coordinate system, based on the airport origin described in the AIP of each airport.

In contrast, the ground movement information (the location information and speed information of the aircraft) acquired by the airport surface detector 110, in particular, through the ASDE, may be provided based on another origin in the airport.

The mapper 120 converts the coordinate value of the ground movement information based on the airport origin. For example, the ASDE installed at Incheon International Airport provides location information and speed information of an aircraft based on a 33L runway threshold as the origin. Accordingly, in order to map the ground movement information of an aircraft acquired based on the ASDE of Incheon International Airport with the node information of Incheon International Airport, the ASDE coordinate needs to be converted based on the airport origin.

Figure 2:
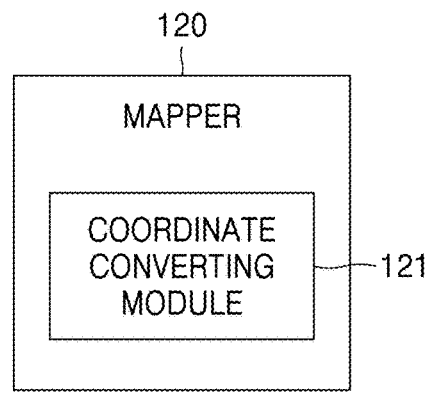
FIG. 2 schematically illustrates a configuration of a mapper, according to an embodiment.

FIG. 2 schematically illustrates a configuration of the mapper 120 according to an embodiment. The mapper 120 may include a coordinate converting module 121 that converts the coordinates of the location information included in the ground movement information to coordinates corresponding to the node information.

Figure 4:
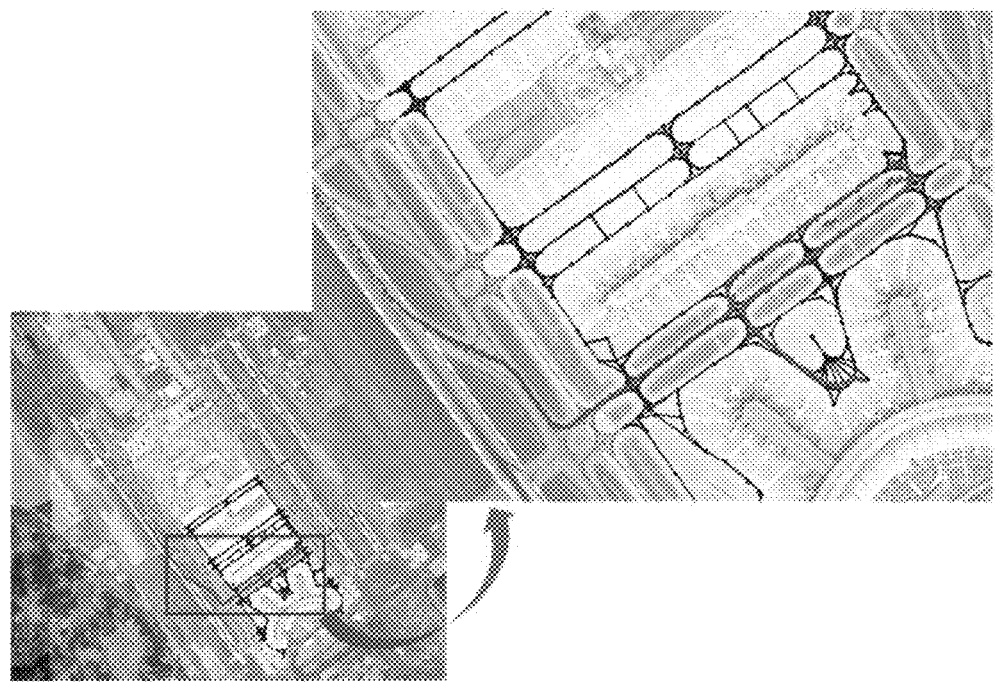

FIG. 4 illustrates a result of the mapping of the ground movement information of a specific aircraft acquired by the ASDE of Incheon International Airport with the node information. In FIG. 4, points displayed in pink may indicate location information of the aircraft acquired by the ASDE, and it may be seen that the points match the node coordinates through the mapping.

The route detector 130 collects adjacent node information with respect to the mapped aircraft ground route coordinates, and detects taxi route information of an aircraft by erasing redundant node information among the collected adjacent node information.

The adjacent node may signify a node existing within a preset distance with respect to the mapped aircraft ground route coordinates. A reference distance to determine the adjacent node may be determined by considering an interval between a route of an aircraft on the taxiway and a ramp in an airport, an interval between queues, or accuracy of the acquired ground movement information of an aircraft.

Since the ASDE generally provides the location information and speed information of an aircraft at about 1 Hz, the aircraft location coordinates may be arranged close to one another on the ramp where the aircraft speed is low. Accordingly, the redundant adjacent nodes may be repeatedly collected, and a process of removing unnecessary nodes from among the collected redundant adjacent nodes is necessary.

For example, when an aircraft stops at the same position for about 100 seconds, a node around the stop position may be continuously collected one hundred times. Accordingly, a process of erasing ninety-nine nodes of the collected same one-hundred nodes may be performed.

A taxi route of the aircraft may be detected after passing through the adjacent node collection and redundant node erasing processes.

Figure 5:
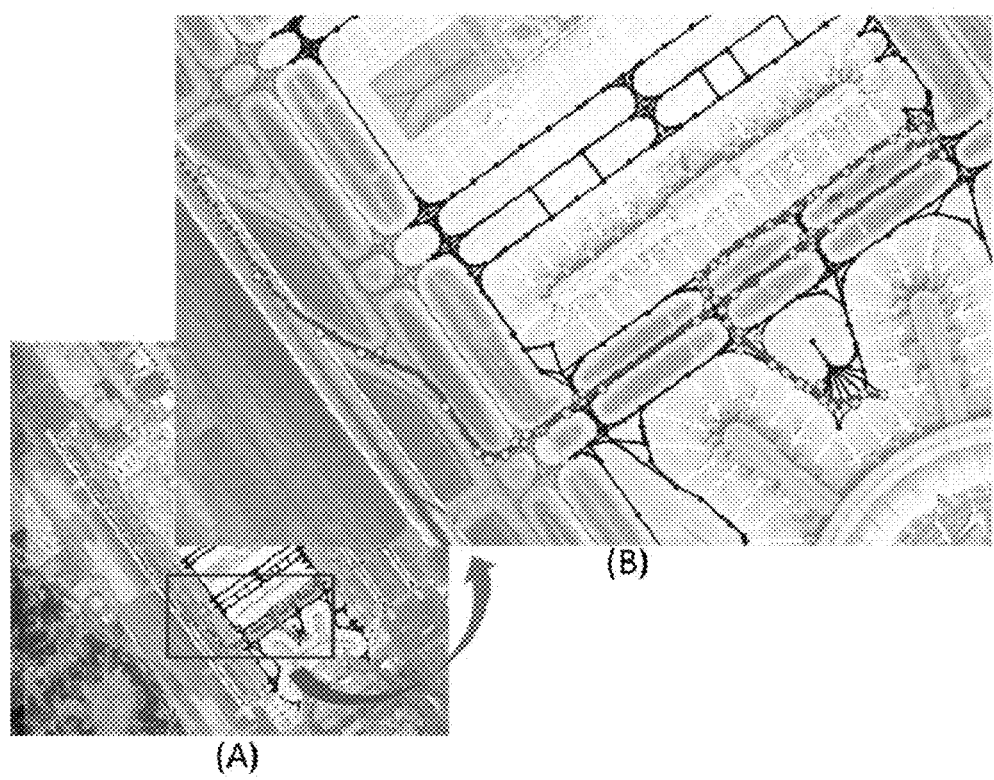

FIG. 5 illustrates a taxi route of an aircraft detected by the route detector 130. In FIG. 5, coordinates indicated by yellow points may signify nodes adjacent to location information of an aircraft acquired by the ASDE and nodes adjacent to coordinates mapped with the location information of an aircraft.

The node identifier 140 identifies departure node information or arrival node information included in the taxi route by using stand node information of an aircraft. The taxi route detected by the route detector 130 may include a plurality of nodes including the start node information and the end node information.

The node identifier 140 identifies a node that is used as a stand from among a gate node, a park node, and a deicing node included in the taxi route.

The stand node information may be acquired from stand assignment information of an aircraft in the airport. When the aircraft is a departing aircraft, the identified stand node is a start node of a taxi route, and a departure node is an end node thereof.

When the aircraft is an arriving aircraft, the identified stand node is an end node of a taxi route, and an arrival node is a start node.

When the taxi route of an aircraft does not include the departure node or the arrival node, the start node or end node of a taxi route may be identified by the following process for each of the departing aircraft and the arrived aircraft.

First, in the case of a departing aircraft, the node identifier 140 identifies a queue node or a taxi node closest to a point that is the earliest entrance to a departure runway, from among the ground movement information of an aircraft acquired by the airport surface detector 110.

When the identified node is a queue node, a departure node most closely connected to the queue node is determined to be the end node of a taxi route of an aircraft.

In this state, the departure node may signify a departure node connected to the queue node and forming a link. Since the departure node connected to the queue node and forming a link may be plurally provided, a method of determining the departure node closest to the queue node among a plurality of departure nodes to be the end node of a taxi route may be employed.

In contrast, when the identified node is a taxi node, a link having only one taxi node connected to the identified taxi node is searched for in the database. When links satisfying the conduction are found in the database, a link including the identified taxi node and a departure node is selected from among the found links, and the departure node included in the selected link may be determined to be an end node of the taxi route.

In general, a plurality of taxi nodes may exist in one route, and there are two or more taxi nodes that are connected to one taxi node. However, since the existence of only one taxi node connected to the identified taxi node may be interpreted such that the route ends around the identified taxi node, the end node may be determined by the above method.

A start node of an arriving aircraft may also be determined by the above method. When no start node exists on a taxi route of the arrival aircraft, the node identifier 140 identifies a queue node or a taxi node closest to an arrival runway among a plurality of nodes included in the taxi route.

When the identified node is a queue node, an arrival node that is most closely connected to the queue node is determined to be a start node of a taxi route of the aircraft.

In contrast, when the identified node is a taxi node, a link having only one taxi node connected to the identified taxi node is searched for in the database. When links satisfying these conditions are found in the database, a link including the identified taxi node and an arrival node is selected from among the found links, and the arrival node included in the selected link may be determined to be a start node of the taxi route.

The method of identifying a start node and an end node when the stand information of an aircraft is provided is described above. However, when the stand information of an aircraft is not provided, a process of determining a stand node prior to the identification of the start node and the end node is needed.

In the case of a departure aircraft, among the gate node, the park node, and the deicing node, a node closest to the first position of an aircraft acquired by the airport surface detector 110 may be determined to be a stand node.

Likewise, in the case of an arriving aircraft, among the gate node, the park node, and the deicing node, a node closest to a final position of an aircraft acquired by the airport surface detector 110 may be determined to be a stand node.

Figure 6:
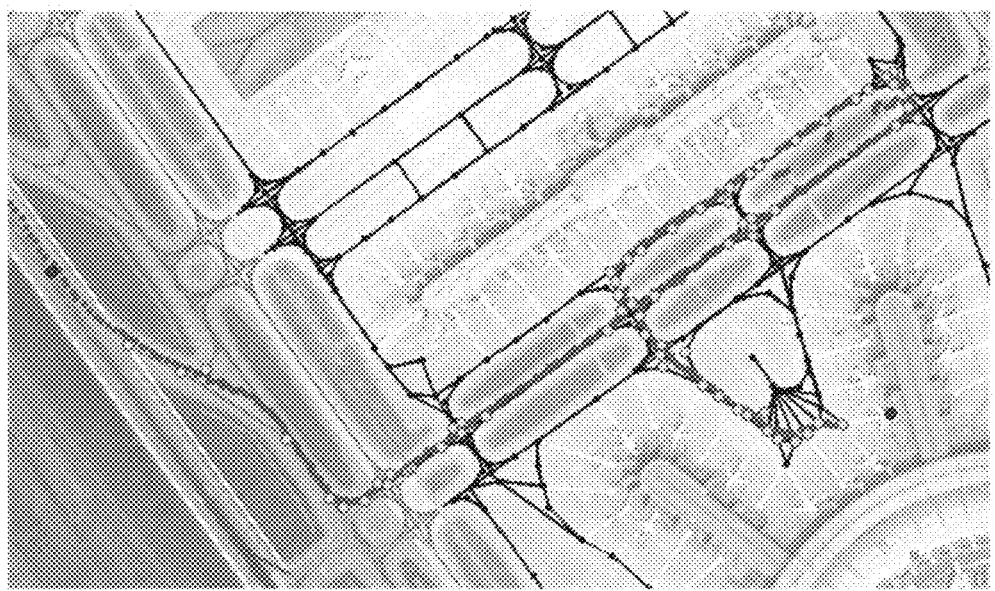

FIG. 6 illustrates a start node and an end node of a taxi route identified by the node identifier 140, in which positions indicated by red points correspond to the start node and the end node.

The final route extractor 150 divides the taxi route into a plurality of sub-routes, applies a shortest route algorithm to the divided sub-routes, and extracts a final taxi route including an extracted shortest route.

In this state, the final route extractor 150 may perform an operation of removing invalid nodes from a plurality of nodes included in the taxi route, prior to the extraction of the final taxi route.

When a link is generated by sequentially arranging a plurality of nodes located between the start node and the end node identified by the node identifier 140, and the generated link is not included in the node information stored in the database, the link is determined to be invalid data and is erased from the taxi route.

The final route extractor 150 may add a new node in a section corresponding to the erased link. In this state, the added node may satisfy the conditions to form a valid link included in the section, and may be determined by considering the node information included in the database.

Figure 7:
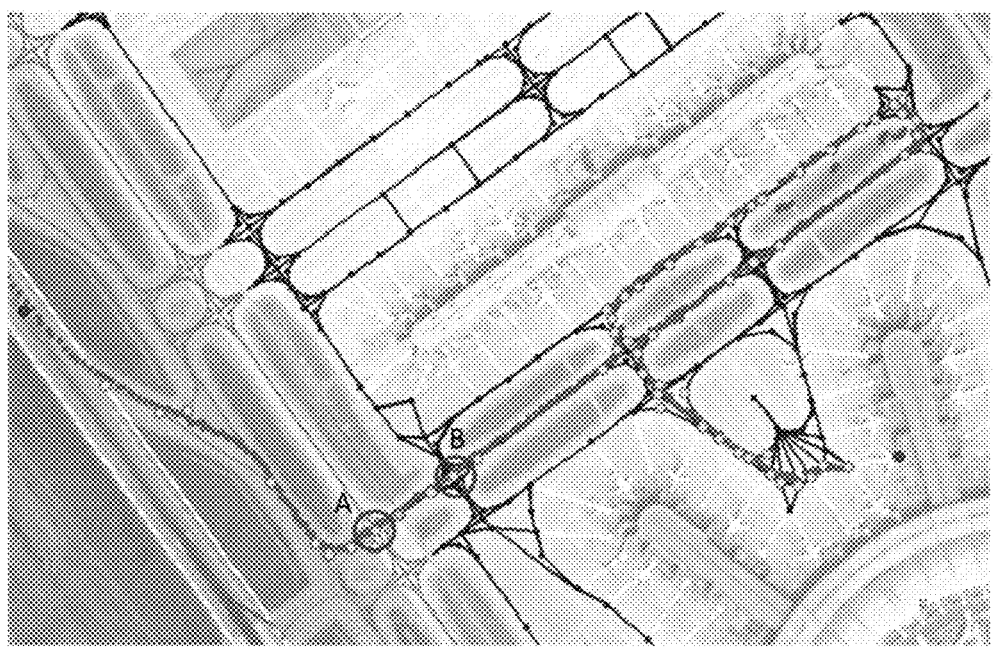

FIG. 7 illustrates a taxi route where invalid nodes are removed through the above-described process. In FIG. 7, it may be seen that, compared to the taxi route of FIG. 6, some nodes are removed between a point A and a point B.

A Dijkstra algorithm may be used as the shortest route algorithm. The Dijkstra algorithm is an algorithm for obtaining the shortest distance between two nodes in a directed graph with a weight, which may be employed only when there is no negative weight.

When the Dijkstra algorithm is applied to the present inventive concept, the weight may be a distance between nodes, that is, the length of a link. The Dijkstra algorithm may search for the shortest route by calculating the lengths of links of all nodes connected to each node from a start node of a taxi route to an end node thereof.

Aircrafts in an actual airport may frequently take a long way around instead of a short route due to ground traffic congestion on the ramp and the taxiway. The Dijkstra algorithm extracts the shortest route with respect to the divided sub-routes.

When the taxi route is divided into a plurality of sub-routes, in order to prevent generation of a loss with respect to the bypass route, an aircraft heading change may be monitored based on the collected node information, and a rough aircraft turn point may be identified therefrom. The sub-routes may be generated based on a node corresponding to the identified turn point.

Figure 8:
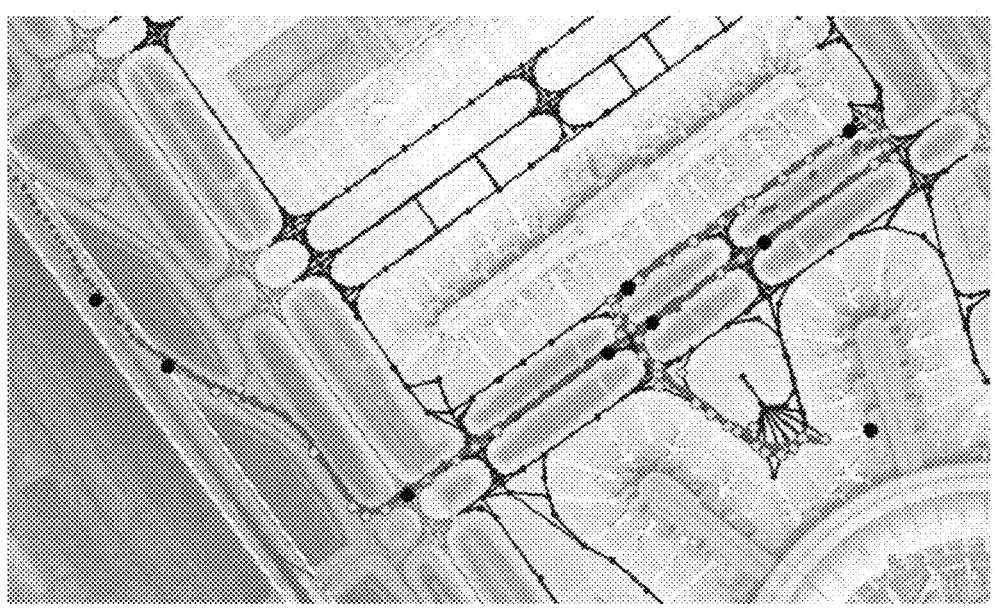

FIG. 8 illustrates that a taxi route is divided into a plurality of sub-routes. In FIG. 8, a node indicated in a block may be an aircraft turn point identified by monitoring an aircraft heading change based on the collected node information, and may signify a start node or an end node of a sub-route.

Figure 9:
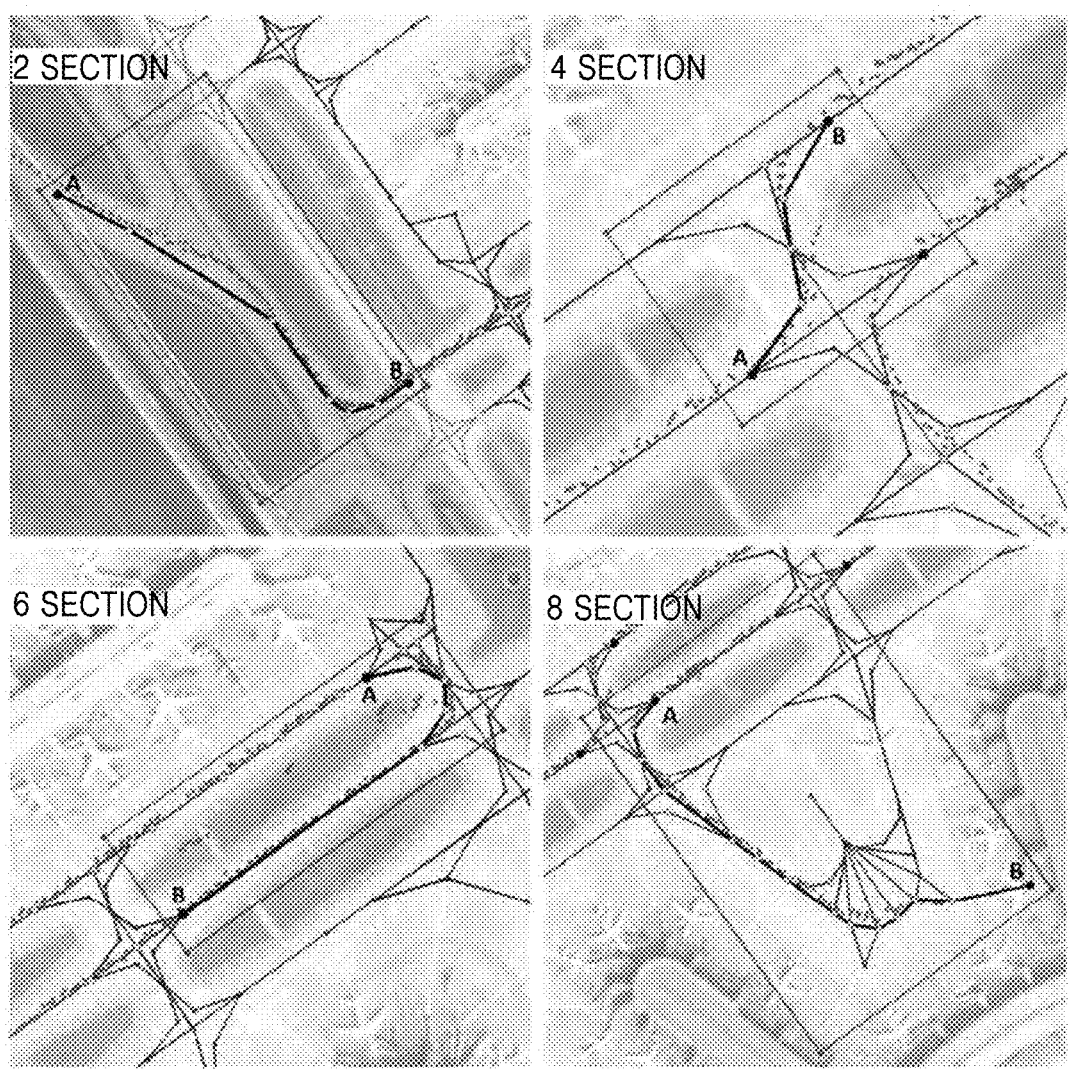

Images illustrated in FIG. 9 indicate some of the divided sub-routes, in which a section AB indicated in a block in each image may signify the shortest distance between a node A and a node B. The shortest distance may be understood as being extracted by using the shortest route algorithm.

Figure 10:
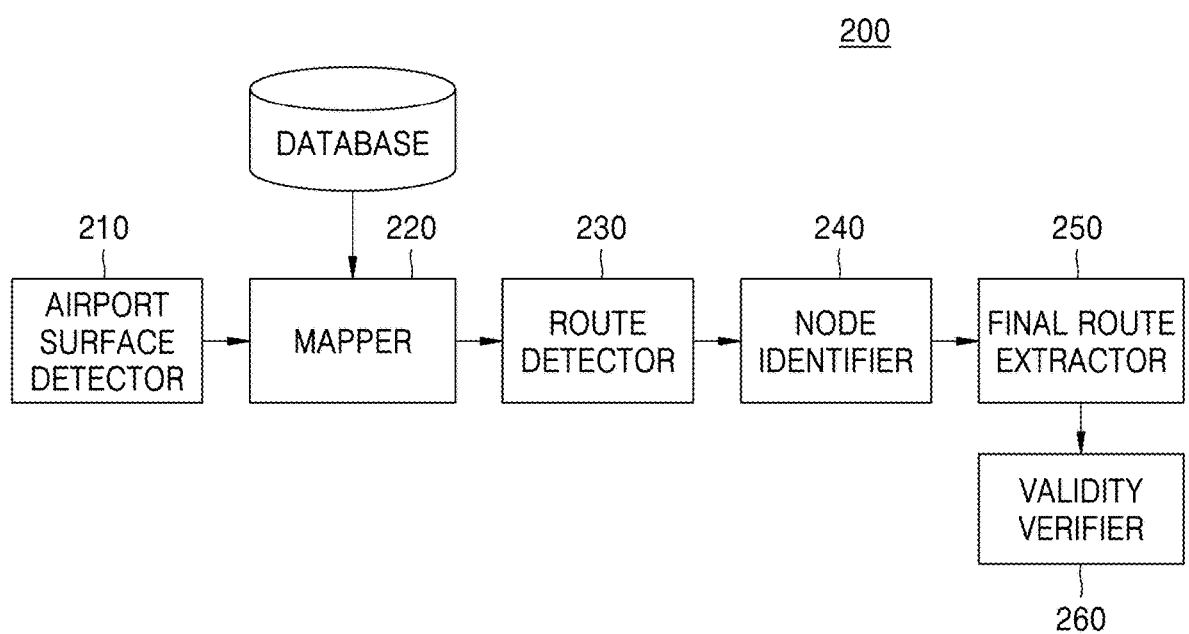
FIG. 10 schematically illustrates a configuration of a system for extracting a ground route of an aircraft, according to another embodiment.

FIG. 10 schematically illustrates a configuration of a system for extracting a ground route of an aircraft according to another embodiment.

Referring to FIG. 10, the system 200 for extracting a ground route of an aircraft according to the present embodiment may include an airport surface detector 210, a mapper 220, a route detector 230, a node identifier 240, a final route extractor 250, and a validity verifier 260.

Since the airport surface detector 210, the mapper 220, the route detector 230, the node identifier 240, and the final route extractor 250, respectively, perform substantially the same operations as the airport surface detector 110, the mapper 120, the route detector 130, the node identifier 140, and the final route extractor 150 described with reference to FIG. 1, detailed descriptions of the redundant elements are omitted.

The validity verifier 260 verifies the validity of a final taxi route extracted by the final route extractor 250. In detail, the validity verifier 260 determines the final taxi route to be a valid final taxi route only when the final taxi route includes an essential node.

The essential node may include one of the gate node, the park node, and the deicing node, and may further include one departure node when the aircraft is a departing aircraft and one arrival node when the aircraft is an arriving aircraft.

Figure 11:
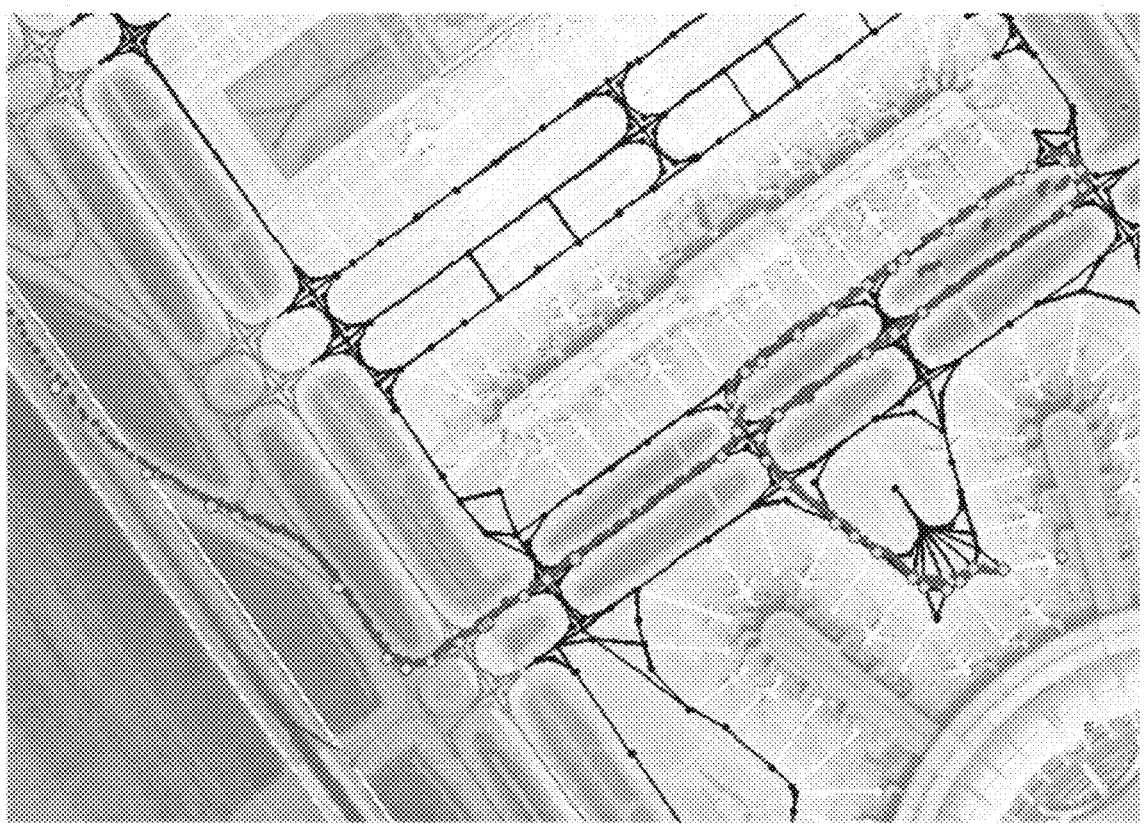
FIG. 11 illustrates an example of a final taxi route of an aircraft finally extracted through validity verification.

FIG. 11 illustrates an example of a final taxi route of an aircraft finally extracted through validity verification. As described above with reference to FIG. 10, the validity verifier 260 may determine the final taxi route to be a valid final taxi route according to whether the final taxi route extracted by the final route extractor 250 includes the essential node.

Furthermore, the validity verifier 260 may determine each final taxi route to be a valid final taxi route only when the aircraft is a departing aircraft and the final taxi route includes one departure node, and only when the aircraft is an arriving aircraft and the final taxi route includes one arrival node.

Figure 12:
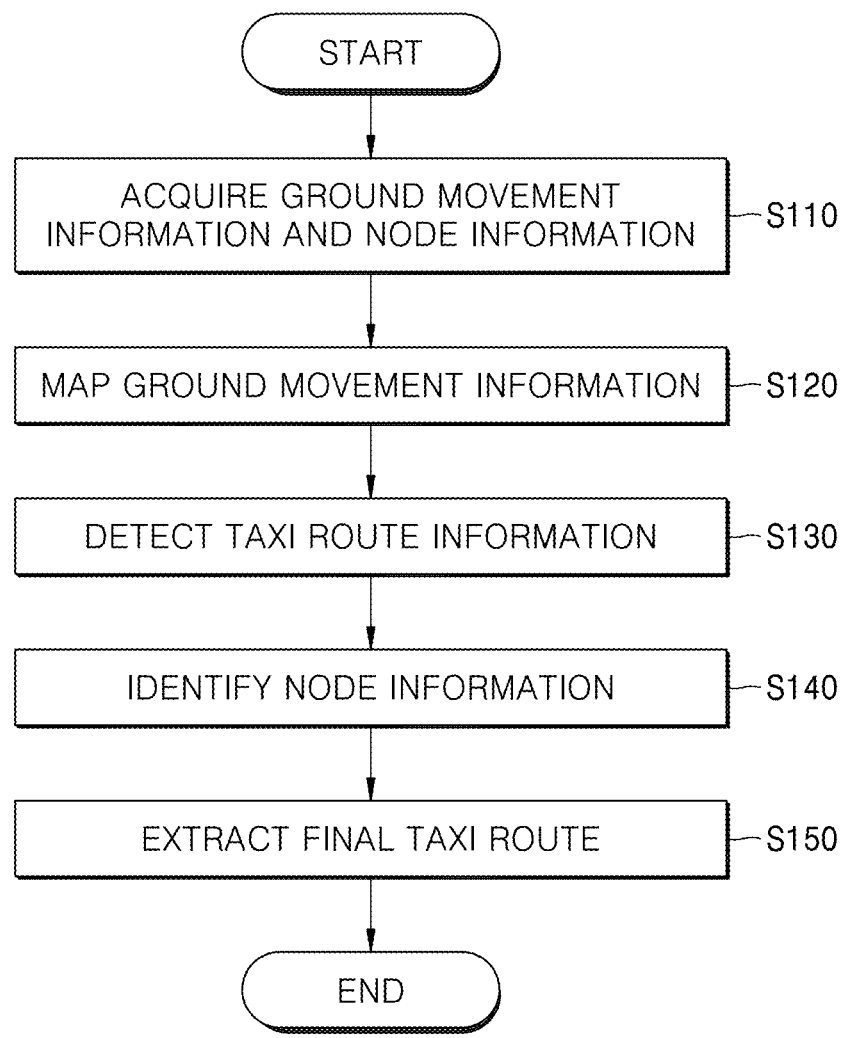
FIG. 12 is a flowchart schematically illustrating operations of a method of extracting a ground route of an aircraft, according to an embodiment.

FIG. 12 is a flowchart schematically illustrating operations of a method of extracting a ground route of an aircraft, according to an embodiment.

Referring to FIG. 12, a method of extracting a ground route of an aircraft, according to the present embodiment, may include a ground movement information and node information acquiring operation (S110), a ground movement information mapping operation (S120), a taxi route information detecting operation (S130), a node information identifying operation (S140), and a final taxi route extracting operation (S150).

In the ground movement information and node information acquiring operation (S110), ground movement information of an aircraft detected in an airport and node information of the airport are acquired. The method of extracting a ground route of an aircraft according to the present embodiment extracts a ground route of an aircraft. In the ground movement information and node information acquiring operation (S110), information about movement of the aircraft on the ground in an airport is acquired.

Accordingly, when the aircraft is a departing aircraft, ground movement information of the aircraft may be information about a route from a gate until take-off. Furthermore, when the aircraft is an arriving aircraft, ground movement information of the aircraft may be information about a route to a gate after landing.

The ground movement information may include location information and speed information of an aircraft, and time information regarding when the location information and speed information of the aircraft are detected. By analyzing the ground movement information, location information of the aircraft on the ground in an airport according to a time, and speed information at the location, may be identified.

Furthermore, an actual route until take-off in the airport may be determined and an actual route to a gate after landing may be determined.

To acquire the ground movement information, the ground movement information and node information acquiring operation (S110) may include the ASDE. The ASDE may refer to an airport surface detection radar and may be used to monitor a traffic amount on the airport surface and control aircrafts and vehicles running on the ground when the weather in the airport is bad or the position of a control tower is inadequate for clearly observing a runway or taxiway with the naked eye. Furthermore, the radar used for the ASDE may have a high resolution power to identify aircrafts and vehicles on the runway or taxiway and indicate the identified objects on a display device.

Furthermore, in the ground movement information and node information acquiring operation (S110), the node information of an airport is acquired from a database. The node information is obtained by dividing a ramp, a taxiway, a runway, etc. along which aircrafts move in the airport in the form of nodes according to regular rules, and may include modes signifying important positions on the airport surface that may affect a traffic flow, and link information connecting a node to another node.

Furthermore, the node information may be acquired from the AIP of the airport. Referring to the AIP, an overall ground traffic operation status such as the overall shape of an airport, the number of gates, the TCP between a taxiway and a ramp, the direction of transfer of control of each TCP, the direction of a movement of an aircraft on the ramp and taxiway, a push-back procedure of an aircraft for each gate, the shape and the number of runway queues, runway operation direction and mode, de-icing facilities, and an operation procedure, may be checked. The types of the node and the link included in the node information are the same as those described above with reference to FIG. 1.

The node information may be classified by a node ID and a node type indicated by a number at an important point in the airport, and a coordinate value may be assigned to each node. The coordinate value may be converted to latitude/longitude/altitude values.

When a taxi route of an aircraft is generated by referring to the AIP of an airport, the route may be very simple. This is because it is not easy to set various aircraft bypass ground routes that may occur in an actual control situation, in consideration of traffic congestion on an airport surface and a conflict between aircrafts.

In the ground movement information mapping operation (S120), the ground movement information is mapped with the node information to extract a ground route of an aircraft actually operated in the airport.

The coordinate value assigned to each node is provided as X (East axis) and Y (North axis) values in an ENU (East, North, Up) coordinate system based on the airport origin described in the AIP of each airport.

In contrast, the ground movement information (location information and aircraft speed information of an aircraft) acquired in the ground movement information and node information acquiring operation (S110), in particular, through the ASDE, may be provided based on another origin in the airport.

In the taxi route information detecting operation (S130), adjacent node information is collected with respect to the mapped aircraft ground route coordinates, and taxi route information of the aircraft is detected by erasing redundant node information among the collected adjacent node information.

The adjacent node may signify a node existing within a preset distance with respect to the mapped aircraft ground route coordinates. A reference distance to determine the adjacent node may be determined by considering an interval between a route of an aircraft on the taxiway and a ramp in an airport, an interval between queues, or accuracy of the acquired ground movement information of the aircraft.

Since the ASDE generally provides the location information and speed information of an aircraft at about 1 Hz, the aircraft location coordinates may be arranged close to one another on the ramp where the aircraft speed is low. Accordingly, the redundant adjacent nodes may be repeatedly collected, and a process of removing unnecessary nodes from among the collected redundant adjacent nodes is necessary.

A taxi route of the aircraft may be detected after passing through the adjacent node collection and redundant node erasing processes.

In the node information identifying operation (S140), start node information or end node information included in the taxi route is identified by using the stand node information of the aircraft.

In the node information identifying operation (S140), departure node information or arrival node information included in the taxi route is identified by using the stand node information of the aircraft. The taxi route detected in the taxi route information detecting operation (S130) may include a plurality of nodes including the start node information and the end node information.

In the node information identifying operation (S140), a node that is used as a stand is identified from among a gate node, a park node, and a deicing node included in the taxi route in the node information stored in the database.

The stand node information may be acquired from stand assignment information of an aircraft in the airport. When the aircraft is a departing aircraft, the identified stand node is a start node of a taxi route, and a departure node is an end node thereof.

When the aircraft is an arriving aircraft, the identified stand node is an end node of a taxi route, and an arrival node is a start node.

When the taxi route of an aircraft does not include the departure node or the arrival node, the start node or end node of a taxi route may be identified by the following process for each of the departure aircraft and the arriving aircraft.

First, in the case of a departure aircraft, in the node information identifying operation (S140), a queue node or a taxi node closest to a point that is the earliest entrance to a departure runway is identified from among the ground movement information of the aircraft acquired in the ground movement information and node information acquiring operation (S110).

When the identified node is a queue node, a departure node most closely connected to the queue node is determined to be the end node of a taxi route of an aircraft.

In this state, the departure node may signify a departure node connected to the queue node and forming a link. Since the departure node connected to the queue node and forming a link may be plurally provided, a method of determining the departure node closest to the queue node among a plurality of departure nodes to be the end node of a taxi route may be employed.

In contrast, when the identified node is a taxi node, a link having only one taxi node connected to the identified taxi node is searched for in the database. When links satisfying these conditions are found in the database, a link including the identified taxi node and a departure node is selected from among the found links, and the departure node included in the selected link may be determined to be an end node of the taxi route.

In general, a plurality of taxi nodes may exist in one route, and there are two or more taxi nodes that are connected to one taxi node. However, since the existence of only one taxi node connected to the identified taxi node may be interpreted such that the route ends around the identified taxi node, the end node may be determined by the above method.

A start node of an arriving aircraft may also be determined by the above method. When no start node exists on a taxi route of the arriving aircraft, in the node information identifying operation (S140), a queue node or a taxi node closest to an arrival runway is identified from among a plurality of nodes included in the taxi route.

When the identified node is a queue node, an arrival node that is most closely connected to the queue node is determined to be a start node of a taxi route of the aircraft.

In contrast, when the identified node is a taxi node, a link having only one taxi node connected to the identified taxi node is searched for in the database. When links satisfying these conditions are found in the database, a link including the identified taxi node and an arrival node is selected from among the found links, and the arrival node included in the selected link may be determined to be a start node of the taxi route.

The method of identifying a start node and an end node when the stand information of the aircraft is provided is described above. However, when the stand information of the aircraft is not provided, a process of determining a stand node prior to the identification of the start node and the end node is needed.

In the case of a departure aircraft, among the gate node, the park node, and the deicing node, a node closest to the first position of an aircraft acquired in the ground movement information and node information acquiring operation (S110) may be determined to be a stand node.

Likewise, in the case of an arriving aircraft, among the gate node, the park node, and the deicing node, a node closest to a final position of an aircraft acquired in the ground movement information and node information acquiring operation (S110) may be determined to be a stand node.

In the final taxi route extracting operation (S150), the taxi route is divided into a plurality of sub-routes, a shortest route algorithm is applied to the divided sub-routes, and a final taxi route including an extracted shortest route is extracted.

In this state, in the final taxi route extracting operation (S150), an operation of removing invalid nodes from a plurality of nodes included in the taxi route may be performed prior to the extraction of the final taxi route.

When a link is generated by sequentially arranging a plurality of nodes located between the start node and the end node identified in the node information identifying operation (S140), and the generated link is not included in the node information stored in the database, the link is determined to be invalid data and is erased from the taxi route.

A new node may be added to a section corresponding to the link erased in the final taxi route extracting operation (S150). In this state, the added node may satisfy the condition for forming a valid link included in the section, and may be determined by considering the node information included in the database.

A Dijkstra algorithm may be used as the shortest route algorithm. The Dijkstra algorithm is an algorithm for obtaining the shortest distance between two nodes in a directed graph with a weight, which may be employed only when there is no negative weight.

When the Dijkstra algorithm is applied to the present inventive concept, the weight may be a distance between nodes, that is, the length of a link. The Dijkstra algorithm may search for the shortest route by calculating the lengths of links of all nodes connected to each node from a start node of a taxi route to an end node thereof.

Aircrafts in an actual airport may frequently take a long way around instead of a short route due to ground traffic congestion on the ramp and the taxiway. The Dijkstra algorithm divides the taxi route into a plurality of sub-routes and extracts the shortest route with respect to the divided sub-routes.

When the taxi route is divided into a plurality of sub-routes, in order to prevent generation of a loss with respect to the bypass route, an aircraft heading change may be monitored based on the collected node information, and a rough aircraft turn point may be identified therefrom. The sub-routes may be generated based on a node corresponding to the identified turn point.

Figure 13:
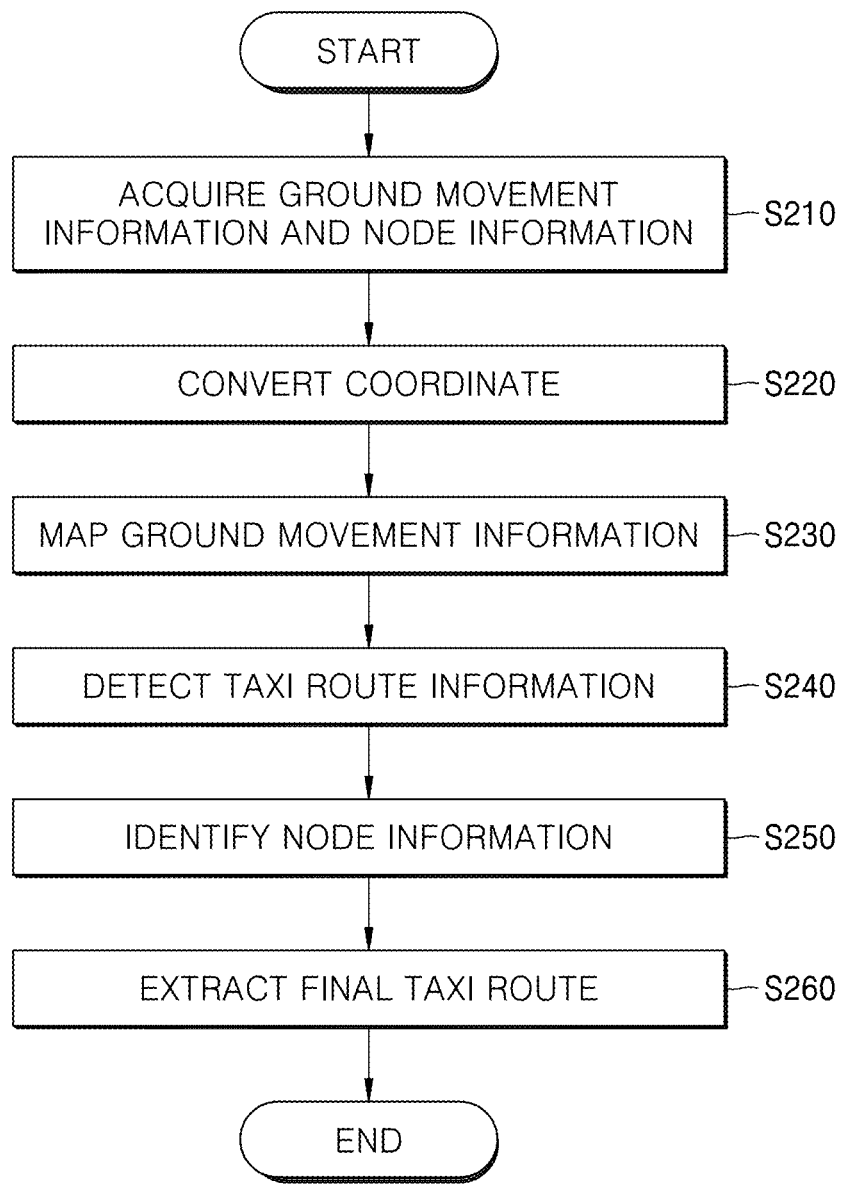
FIG. 13 is a flowchart schematically illustrating operations of a method of extracting a ground route of an aircraft, according to another embodiment.

FIG. 13 is a flowchart schematically illustrating operations of a method of extracting a ground route of an aircraft, according to another embodiment.

Referring to FIG. 13, the method of extracting a ground route of an aircraft, according to the present embodiment, may include a ground movement information and node information acquiring operation (S210), a coordinate converting operation (S220), a ground movement information mapping operation (S230), a taxi route information detecting operation (S240), a node information identifying operation (S250), and a final taxi route extracting operation (S260).

Since the ground movement information and node information acquiring operation (S210), the ground movement information mapping operation (S230), the taxi route information detecting operation (S240), the node information identifying operation (S250), and the final taxi route extracting operation (S260), respectively, are substantially the same as the ground movement information and node information acquiring operation (S110), the ground movement information mapping operation (S120), the taxi route information detecting operation (S130), the node information identifying operation (S140), and the final taxi route extracting operation (S150) described in FIG. 12, detailed descriptions of the redundant operations are omitted.

In the coordinate converting operation (S220), the coordinates of the ground movement information is converted based on the airport origin. For example, in the case of the ASDE installed at Incheon International Airport, the location information and speed information of an aircraft is provided based on the 33L runway threshold as the origin. Accordingly, in order to map the ground movement information of an aircraft acquired by the ASDE of Incheon International Airport with the node information of Incheon International Airport, a process of converting an ASDE coordinate with respect to the airport origin is needed.

FIG. 14 is a flowchart schematically illustrating operations of a method of extracting a ground route of an aircraft, according to another embodiment.

Referring to FIG. 14, the method of extracting a ground route of an aircraft, according to the present embodiment, may include a ground movement information and node information acquiring operation (S310), a ground movement information mapping operation (S320), a taxi route information detecting operation (S330), a node information identifying operation (S340), a final taxi route extracting operation (S350), and a validity verification operation (S360).

Since the ground movement information and node information acquiring operation (S310), the ground movement information mapping operation (S320), the taxi route information detecting operation (S330), the node information identifying operation (S340), and the final taxi route extracting operation (S350), respectively, are substantially the same as the ground movement information and node information acquiring operation (S110), the ground movement information mapping operation (S120), the taxi route information detecting operation (S130), the node information identifying operation (S140), and the final taxi route extracting operation (S150), detailed descriptions of the redundant operations are omitted.

In the validity verification operation (S360), validity of a final taxi route extracted in the final taxi route extracting operation (S350) is verified. In detail, in the validity verification operation (S360), the final taxi route is determined to be a valid final taxi route only when the final taxi route includes an essential node.

The essential node may include one of the gate node, the park node, and the deicing node, and may further include one departure node when the aircraft is a departing aircraft and one arrival node when the aircraft is an arriving aircraft.

Furthermore, in the validity verification operation (S360), each final taxi route may be determined to be a valid final taxi route only when the aircraft is a departing aircraft and the final taxi route includes one departure node, and only when the aircraft is an arriving aircraft and the final taxi route includes one arrival node.

The inventive concept can also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, etc. The computer-readable recording medium can also be distributed over network-coupled computer systems so that the computer-readable code is stored and executed in a distributed fashion. Also, functional programs, codes, and code segments for accomplishing the present inventive concept can be easily construed by programmers of ordinary skill in the art to which the present inventive concept pertains.

The use of any and all examples, or language (e.g., "such as") provided herein, is intended merely to better illuminate the inventive concept and does not pose a limitation on the scope of the inventive concept unless otherwise claimed. Numerous modifications and adaptations will be readily apparent to one of ordinary skill in the art without departing from the spirit and scope of the present inventive concept.

While the present inventive concept has been particularly shown and described with reference to embodiments thereof, it will be understood by those of ordinary skill in the art that various changes in form and details may be made therein without departing from the spirit and scope of the present inventive concept as defined by the following claims.

As described above, in the ground movement simulation of aircrafts in an airport according to the above-described embodiments, the system and the method of extracting a ground route of an aircraft, may generate a relatively accurate movement route by reflecting an actual situation, in a ground movement simulation of aircrafts in an airport.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A system for extracting a ground route of an aircraft, the system comprising:
   an airport surface detector acquiring ground movement information of an aircraft detected in an airport;
   a mapper acquiring node information of the airport from a database and mapping the ground movement information with the node information;
   a route detector detecting taxi route information of the aircraft by collecting adjacent node information of a mapped coordinate and erasing redundant node information among collected adjacent node information;
   a node identifier identifying start node information or end node information of a taxi route by using stand node information of the aircraft; and
   a final route extractor extracting a final taxi route including an extracted shortest route by dividing the taxi route into a plurality of sub-routes and applying a shortest route algorithm to the divided sub-routes.

2. The system of claim 1, wherein the ground movement information of the aircraft comprises location information and speed information of the aircraft, and time information regarding when the location information and speed information of the aircraft are detected.

3. The system of claim 2, wherein the airport surface detector comprises the Airport Surface Detection Equipment (ASDE).

4. The system of claim 1, wherein the node identifier determines a stand node when stand node information of an aircraft does not exist, determines a node closest to a first position of the aircraft acquired by the airport surface detector to be the stand node, from among a gate node, a park node, and a deicing node, when the aircraft is a departing aircraft, and determines a node closest to a final position of the aircraft acquired by the airport surface detector to be the stand node, from among the gate node, the park node, and the deicing node, when the aircraft is an arriving aircraft.

5. The system of claim 1, wherein the mapper comprises a coordinate converting module that converts coordinates of location information included in the ground movement information to coordinates corresponding to the node information, and
   the coordinate converting module maps converted coordinates of the location information with the node information.

6. The system of claim 1, further comprising a validity verifier verifying validity of the final taxi route,
   wherein the validity verifier determines the final taxi route to be a valid final taxi route only when the final taxi route includes an essential node.

7. The system of claim 6, wherein the essential node comprises one of a gate node, a park node, and a deicing node,
   when the aircraft is a departing aircraft, the essential node further comprises one departure node, and
   when the aircraft is an arriving aircraft, the essential node further comprises one arrival node.

8. The system of claim 1, wherein the final route extractor extracts a shortest route by using a Dijkstra algorithm.

9. The system of claim 1, wherein the node information is acquired by an Aeronautical Information Publication (AIP) of the airport.

10. A method of extracting a ground route of an aircraft, the method comprising:
    acquiring ground movement information of an aircraft detected in an airport and node information of the airport;
    mapping the ground movement information with the node information;
    detecting taxi route information of the aircraft by collecting adjacent node information of a mapped coordinate and erasing redundant node information among collected adjacent node information;
    identifying start node information or end node information included in a taxi route by using stand node information of the aircraft; and
    extracting a final taxi route including an extracted shortest route by dividing the taxi route into a plurality of sub-routes and applying a shortest route algorithm to the divided sub-routes.

11. The method of claim 10, wherein the ground movement information of the aircraft comprises location information and speed information of the aircraft, and time information regarding when the location information and speed information of the aircraft are detected.

12. The method of claim 11, wherein the airport surface detector comprises Airport Surface Detection Equipment (ASDE).

13. The method of claim 10, wherein, in the identifying of the start node information or the end node information, a stand node is determined when stand node information of an aircraft does not exist, wherein, from among a gate node, a park node, and a deicing node, a node closest to a first position of the aircraft acquired by the airport surface detector is determined to be the stand node when the aircraft is a departing aircraft, and, from among the gate node, the park node, and the deicing node, a node closest to a final position of the aircraft acquired by the airport surface detector is determined to be the stand node when the aircraft is an arriving aircraft.

14. The method of claim 10, further comprising converting coordinates of location information included in the ground movement information to coordinates corresponding to the node information,
wherein, in the mapping of the ground movement information with the node information, converted coordinates of the location information are mapped with the node information.

15. The method of claim 10, further comprising verifying validity of the final taxi route,
wherein, in the verifying of validity of the final taxi route, the final taxi route is determined to be a valid final taxi route only when the final taxi route includes an essential node.

16. The method of claim 15, wherein the essential node comprises one of a gate node, a park node, and a deicing node, and further comprises one departure node when the aircraft is a departing aircraft and one arrival node when the aircraft is an arriving aircraft.

17. The method of claim 10, wherein, in the extracting of the final taxi route, a shortest route is extracted by using a Dijkstra algorithm.

18. The method of claim 10, wherein the node information is acquired by an Aeronautical Information Publication (AIP) of the airport.

19. A non-transitory computer-readable storage medium having stored thereon a program, which when executed by a computer, performs a method of extracting a ground route of an aircraft, the method comprising:
acquiring ground movement information of an aircraft detected in an airport and node information of the airport;
mapping the ground movement information with the node information;
detecting taxi route information of the aircraft by collecting adjacent node information of a mapped coordinate and erasing redundant node information among collected adjacent node information;
identifying start node information or end node information included in a taxi route by using stand node information of the aircraft; and
extracting a final taxi route including an extracted shortest route by dividing the taxi route into a plurality of sub-routes and applying a shortest route algorithm to the divided sub-routes.

* * * * *